(12) United States Patent
Jung et al.

(10) Patent No.: US 6,288,200 B1
(45) Date of Patent: *Sep. 11, 2001

(54) POLYISOCYANATE COMPOSITION

(75) Inventors: Bruno Andrew Alphonse Jung, Woluwe-St-Pierre; Jan Willem Leenslag, Tremelo; Hans Guido Godelieve Verbeke, Linden; Danny Anna Eduard Geukens, Olen, all of (BE)

(73) Assignee: Imperial Chemical Industries PLC, London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/741,075

(22) Filed: Oct. 30, 1996

(30) Foreign Application Priority Data

Nov. 6, 1995 (EP) .................................................. 95117436
Feb. 9, 1996 (EP) .................................................. 96101892

(51) Int. Cl.$^7$ .................................................. C08G 18/22
(52) U.S. Cl. ...................... 528/56; 527/401; 252/182.2
(58) Field of Search ............................ 252/182.2; 528/56; 527/401

(56) References Cited

U.S. PATENT DOCUMENTS

| | | | |
|---|---|---|---|
| 4,426,510 | 1/1984 | DelDonno | 528/49 |
| 4,477,366 | 10/1984 | Robertson | 252/182 |
| 4,568,703 | 2/1986 | Ashida | 521/124 |
| 5,344,484 | 9/1994 | Walsh | 106/201 |

FOREIGN PATENT DOCUMENTS

| | | |
|---|---|---|
| 869988 | 6/1961 | (GB) . |
| 908949 | 10/1964 | (GB) . |
| 2021609 | 12/1979 | (GB) . |
| 75/138097 | 11/1975 | (JP) . |
| 06/169824 | 4/1986 | (JP) . |
| 63/207622 | 8/1988 | (JP) . |
| 95/02619 | 1/1995 | (WO) . |
| 95/13323 | 5/1995 | (WO) . |

OTHER PUBLICATIONS

Monte, Salvatore J. and Sugerman, Gerald, "The Use of Titanate Coupling Agents in Urethanes", *Journal of Cellular Plastics*, vol. 19, 1983, p. 93, Mar., 1983.

*Primary Examiner*—Rachel Gorr
(74) *Attorney, Agent, or Firm*—Pillsbury Winthrop LLP

(57) ABSTRACT

Polyisocyanate composition comprising a Group IVB metal compound, preferably a titanium chelate, optionally in combination with a compatibilizing compound and/or conventional release agents and the use thereof in binding lignocellulosic material.

39 Claims, No Drawings

POLYISOCYANATE COMPOSITION

This invention relates to polyisocyanate compositions and in particular to polyisocyanate compositions for use in binding lignocellulosic material.

The use of organic polyisocyanates as binders for lignocellulosic material in the manufacture of sheets or moulded bodies such as waferboard, chipboard, fibreboard and plywood is well known.

In a typical process the organic polyisocyanate, optionally in the form of a solution, dispersion or aqueous emulsion, is applied to the lignocellulosic material which is then subjected to heat and pressure.

The high quality of the resulting materials is due, to a very large extent, to the excellent adhesive properties of organic polyisocyanates. At the same time, however, the excellent adhesive properties offered by a polyisocyanate creates an offsetting disadvantage in that it causes severe sticking of the lignocellulosic material to the hot metal surfaces with which it comes into contact during the hot-pressing operation. Most often the product is damaged in removing it from the press and much time is required to remove adhering cellulosic material from the surfaces of the press parts.

Several attempts have been made to overcome this adhesion problem. One of these approaches involves applying a release agent internally with the polyisocyanate.

As such internal mold release agents are described compounds which catalyse the formation of isocyanurate from isocyanates (see U.S. Pat. No. 3,870,665) such as certain metal salts of carboxylic acids. Particularly efficient internal mold release agents are zinc stearate and dialkyl tin bismaleates or zinc bismaleates as described in PCT Patent Publication No. 95/02619. In order to solubilise these metal carboxylates, and in particular those based on zinc, in the polyisocyanate composition compatibilising agents as described in PCT Patent Publication No. 95/13323 can be added.

However release performance and/or board properties of lignocellulosic bodies bound with polyisocyanate compositions containing the above described internal release agents are still not satisfactory.

Therefore it is an object of the present invention to provide a polyisocyanate composition that yields satisfactory release of the lignocellulosic bodies bound with said composition from the metal press surfaces without detrimentally affecting the other board properties.

The present invention provides a polyisocyanate composition comprising an organic compound derived from a metal of Group IVB of the Periodic Table of Elements, said organic compound being a metal carboxylate or metal alkoxide or a chelate complex with the metal as central atom and at least one polydentate ligand.

Polyisocyanate compositions containing such organic compounds derived from Group IVB metals show improved release from the press platens and enhanced cure of the lignocellulosic bodies bound with said polyisocyanate compositions.

Preferably the Group IVB metal is titanium or zirconium, most preferably titanium. In case of zirconium based compounds the stability of the composition is improved.

Suitable titanium based organic compounds for use in the present invention include those described in Japanese patent publication no. 63/207622, especially isopropyltriisostearoyltitanate.

Suitable carboxylates or alkoxides include those derived from saturated or unsaturated, aliphatic or cycloaliphatic or aromatic carboxylic acids or alcohols, preferably having from 1 to 30, more preferably from 8 to 20 and most preferably from 10 to 18 carbon atoms. Particularly suitable carboxylic acids include, for example, oleic acid, lauric acid, palmitic acid, stearic acid, mixtures thereof and the like. Particularly suitable alcohols include isopropanol.

The organic compound for use in the present invention can be derived from the same or different carboxylic acids and/or alcohols. Mixed carboxylates/alkoxides can also be used such as diisopropoxy titanium dioleate.

The organic compound for use in the present invention can also contain besides the carboxylate and/or alkoxide groups an alkyl group substituent on the central metal atom.

The chelate complex preferably contains as a polydentate ligand a β-dicarbonyl compound such as acetylacetonate or an acetoacetate. But also polydentates based on bonds between the Group IVB metal and S or N are included within the scope of this invention.

According to a preferred embodiment of the present invention the polyisocyanate composition contains a chelate complex corresponding to the following formula (I)

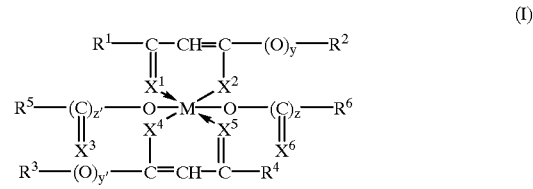

$$\text{(I)}$$

wherein $X^1$, $X^2$, $X^3$, $X^4$, $X^5$ and $X^6$ (same or different) represent O or S or N, z and z' (same or different) are 0 or 1, y and y' (same or different) are 0 or 1, $R^1$ and $R^4$ (same or different) represent an aliphatic hydrocarbon radical having 1 to 30 carbon atoms, $R^2$ and $R^3$ (same or different) represent an aliphatic hydrocarbon radical having 1 to 30 carbon atoms, $R^5$ and $R^6$ (same or different) represent an aliphatic hydrocarbon radical having 1 to 30 carbon atoms and M represents Ti or Zr or Hf.

Preferably M is Ti or Zr, most preferably Ti.
Preferably $X^1$, $X^2$, $X^3$, $X^4$, X5 and $X^6$ all represent O
Preferably $R^5$ and $R^6$ contain from 1 to 20 carbon atoms, most preferably 2 to 3 carbon atoms. Preferably z and z' are both 0.
Preferably $R^1$, $R^2$, $R^3$ and $R^4$ contain from 1 to 20 carbon atoms.

According to one preferred embodiment of the present invention y and y' are both 0 and $R^1$, $R^2$, $R^3$ and $R^4$ contain from 1 to 3 carbon atoms. According to another preferred embodiment of the present invention y and y' are both 0, $R^2$ and $R^3$ contain from 1 to 3 carbon atoms and $R^1$ and $R^4$ contain from 10 to 18 carbon atoms.

Preferred compounds for use according to the present invention are those corresponding to formula (Ia)

$$(R^7O)_aM(R^8C(O)CHC(O)R^9)_b \qquad \text{(Ia)}$$

wherein M represents Ti or Zr, $R^7$ represents an alkoxy or carboxy group, $R^8$ represents an alkyl or aryl group, $R^9$ represents an alkoxy, aryloxy, alkyl or aryl group, a is 4-b and b is 1 or 2 in case of M being Ti and b is 1, 2, 3 or 4 in case of M being Zr.

The present organic compound derived from a Group IVB metal can be obtained by simple exchange reactions of Group IVB metal alkoxides (e.g. isopropyl based) or chlorides (e.g. $TiCl_4$) with alkanol amines, carboxylic acids, hydroxyacids, diketones, keto-esters, glycols and the like;

this followed either by destillation of the corresponding alcohol (e.g. isopropanol) or removal of HCl when using e.g. TiCl$_4$.

The present organic compound derived from a Group IVB metal is used in amounts varying between 0.01 and 20%, preferably between 0.1 and 10%, more preferably between 0.2 and 7% and most preferably between 0.5 and 4% by weight based on the polyisocyanate.

In order to improve the stability of the present polyisocyanate composition a compatibilising agent as described in PCT Patent Publication No. 95/13323, incorporated herein by reference, can be added.

Thus the present invention also provides a polyisocyanate composition containing the present organic compound derived from a metal of Group IVB of the Periodic Table of Elements and a compatibilising agent being a compound corresponding to general formula (II) or the reaction product of an organic mono- or polyfunctional isocyanate therewith

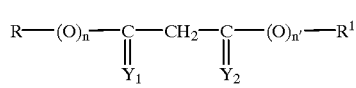
(II)

wherein $Y_1$ and $Y_2$ (same or different) represent O or S; n and n' (same or different) represent an integer of from 0 to 1, R and R' (same or different) represent an aliphatic hydrocarbon radical containing from 1 to 30 carbon atoms and wherein the sum of the total number of carbon atoms of R and R' is between 7 and 40.

The term "aliphatic hydrocarbon radical" as used herein is meant to include straight and branched chain alkyl and cycloalkyl radicals that may include unsaturated groups and/or F, Cl, Br, N, P, S, Si or O containing groups in their chain.

Preferred compounds of formula (II) are those wherein the sum of the total number of carbon atoms of R and R' is between 9 and 20.

Preferably R and/or R' represent aliphatic hydrocarbon radicals containing from 4 to 30, more preferably from 8 to 22 and most preferably from 10 to 18 carbon atoms.

According to a preferred embodiment of the present invention n equals 0, R is a lower alkyl radical such as methyl, n' equals 1 and R' is an alkyl radical containing from 8 to 18 carbon atoms.

According to another preferred embodiment of the present invention n and n' both equal 1 and R and R' both are alkyl radicals containing from 8 to 18 carbon atoms.

Preferably $Y_1$ and $Y_2$ both represent O and n and/or n' equals 1. Preferably n or n' equals 0 and R, or respectively R', is a lower alkyl radical containing 1 to 2 carbon atoms.

Most preferred compounds according to formula (II) are decyl, cetyl and stearyl acetoacetate and bis-decyl malonate.

The organic isocyanate with which the compound according to formula (II) can be reacted to form the compatibilising agent can be monofunctional as well as polyfunctional including diisocyanates and isocyanates of higher functionality. The organic isocyanate can be aliphatic, cycloaliphatic or aromatic. Polyfunctional isocyanates are preferred over monofunctional isocyanates.

Examples of organic isocyanates which may be used in the present invention include aliphatic isocyanates such as hexamethylene diisocyanate; and aromatic isocyanates such as m- and p-phenylene diisocyanate, tolylene-2,4- and -2,6-diisocyanate, diphenylmethane-4,4'-diisocyanate, chlorophenylene-2,4-diisocyanate, naphthylene-1,5-diisocyanate, diphenylene-4,4'-diisocyanate, 4,4'-diisocyanate-3,3'-dimethyldiphenyl, 3-methyldiphenylmethane-4,4'-diisocyanate and diphenyl ether diisocyanate; and cycloaliphatic diisocyanates such as cyclohexane-2,4- and -2,3-diisocyanate, 1-methylcyclohexyl-2,4- and -2,6-diisocyanate and mixtures thereof and bis-(isocyanatocyclohexyl)methane and triisocyanates such as 2,4,6-triisocyanatotoluene and 2,4,4-triisocyanatodiphenylether. Modified polyisocyanates containing isocyanurate, carbodiimide or uretonimine groups may be employed as well.

Further useful isocyanates are methylene bridged polyphenyl polyisocyanates, including diisocyanates, triisocyanates and higher polyisocyanates together with any phosgenation by-products.

Preferred isocyanates to be used to form the compatibilising agent are aromatic diisocyanates or polyisocyanates of higher functionality such as diphenylmethane diisocyanate or mixture of methylene bridged polyphenyl polyisocyanates containing diisocyanates, triisocyanates and higher functionality polyisocyanates.

The compound according to formula (II) and the isocyanate can be pre-reacted to form the compatibilising agent or the compound according to formula (II) can be added to the polyisocyanate composition as such where it can form the reaction product in situ.

The compatibilising agent (in the form of the compound according to formula (II)) is added in an amount varying between 0.5 and 15%, preferably between 1 and 10%, most preferably between 1.5 and 7% by weight based on the polyisocyanate whereas the present organic compound derived from a Group IVB metal is preferably used in an amount ranging from 0.1 to 10%, most preferably from 0.2 to 7% by weight based on the polyisocyanate.

In order to improve the shelf live of the present polyisocyanate composition whilst maintaining satisfactory release performance and board properties some of the present organic compound derived from a Group IVB metal can be replaced by a metal carboxylate derived from metals of Group IA, IIA, IIIA, IB, IIB, IVA, VA and VIII of the Periodic Table of Elements such as Zn, Cu, Co, Mg, Bi, Li, Al, Ni, Cd, Pb, Sn and Fe, especially zinc stearate, lithium stearate, magnesium stearate, aluminium stearate, zinc bismaleate and dialkyl tin bismaleate.

Therefore the present invention also provides a polyisocyanate composition comprising the present organic compound derived from a Group IVB metal and a metal carboxylate derived from a Group IA, IIA, IIIA, IB, IIB, IVA, VA or VIII metal.

The metal carboxylate derived from a Group IA, IIA, IIIA, IB, IIB, IVA, VA or VIII metal is used in amounts varying between 2 and 20%, preferably between 5 and 15% by weight based on -he polyisocyanate while the present organic compound derived from a Group IVB metal is used in amounts varying between 0.2 and 7%, preferably between 0.2 and 3% by weight based on the polyisocyanate.

In order to further improve the stability of such a polyisocyanate composition a compatibilising agent as described above (in terms of the compound corresponding to formula (II)) may be added in amounts varying between 0.5 and 15%, preferably between 1 and 7%, most preferably between 2 and 4% by weight based on the polyisocyanate.

Conventional release agents can be added to the polyisocyanate composition of the present invention containing an organic compound derived from a Group IVB metal and optionally the above described compatibilising agent. By doing so the release performance is further improved; pretreatment of the press platens with external release agents is not needed anymore. Further board properties (especially wet properties) are improved.

The conventional release agent is present in an amount varying between 0.2 and 10%, preferably between 0.5 and 6% and most preferably between 1 and 3% by weight based on the polyisocyanate whereas the organic compound derived from Group IVB metal is preferably present in an amount varying between 0.2 and 4%, most preferably between 0.2 and 2% by weight based on the polyisocyanate and the compatibilising agent is preferably present in an amount varying between 1 and 4% by weight based on the polyisocyanate.

In order to stabilise the emulsion conventional surfactants such as silicones can be added in an amount varying between 0.1 and 1.5%, preferably between 0.25 and 0.75% by weight based on the polyisocyanate.

Examples of conventional release agents include polysiloxanes, saturated or unsaturated fatty acids (such as oleic acid) or fatty acid amides or fatty acid esters and polyolefin waxes. Polysiloxanes and polyolefin waxes are preferred.

Preferred polysiloxanes to be used as an additional release agent according to the present invention are those comprising from about 0.5 to 20 mole % of $R_a R'_b SiO_{[4-(a+b)]/2}$ units and from about 80 to 99.5 mole % of $R''_c SiO_{(4-c)/2}$ units wherein R is an isocyanate reactive organic radical; a has an average value of from about 1 to about 3; R' and R" are non-isocyanate reactive organic radicals; b has an average value of about 0 to about 2; a+b has a value of about 1 to about 3; c has an average value of from about 1 to about 3 and preferably 1 to 1.5; the ratio of the total molecular weight of the polysiloxane compound to the total number of isocyanate reactive functional groups in the polysiloxane molecule (the equivalent weight) ranges from 100 to 3500 and preferably from 500 to 2500; the combined formula weights of all isocyanate reactive organic radicals R do not exceed 40% of the total molecular weight of the polysiloxane compound; the combined formula weights of all non-isocyanate reactive radicals R'+R" together do not exceed 40% of the total molecular weight of the polysiloxane compound; the combined formula weights of all the organic radicals R+R'+R" in the molecule together do not exceed 60% of the total molecular weight of the polysiloxane compound; the polysiloxane compound contains an average of at least two isocyanate reactive functional groups per molecule; at least two of the isocyanate reactive functional groups in each molecule are located on separate organic radicals R, attached independently to different silicon atoms in the polysiloxane compound; the isocyanate reactive functional groups R are selected from the group consisting of alcohols, carboxylic acids, phenols, thiols, primary or secondary aromatic amines which contain no oxygen and have not more than one nitrogen atom attached directly to, in conjugation with or incorporated within, the aromatic ring nucleus, and secondary aliphatic amines wherein at least one of the alkyl carbon atoms, bonded directly to the nitrogen atom, is not a primary carbon atom; the molecular weight of the polysiloxane compound is between 1000 and 30000, preferably 2000 to 15000 and most preferably 4000 to 8000; and the polysiloxane compounds are substantially insoluble in liquid polyisocyanate.

In the polysiloxane compounds the hydroxy, mercapto, or amino organic R radicals can be attached to the silicon atom directly to carbon or through oxygen, nitrogen or sulfur carbon bonds. Preferred R radicals are those of the formula HO—R'''—, $H_2N$—R'''—, HNR'''$_2$, and HS—R'''— wherein R''' is a divalent linking group comprised of carbon and hydrogen; carbon, hydrogen and oxygen; carbon, hydrogen and sulfur; carbon, hydrogen and nitrogen; or carbon, hydrogen, oxygen and nitrogen. Specific examples of R''' include the methylene, ethylene, propylene, hexamethylene, decamethylene, —$CH_2CH(CH_3)$—$CH_2$—, phenylene, butyl phenylene, naphthylene, —$CH_2CH_2SCH_2CH_2$—, —$CH_2CH_2OCH_2$—, —$CH_2CH_2$—$CH_2$—O—$(CH_2$—CHR'O$)_n$—, where n is 0 to 5 and R' is described as above or H. A preferred R group is —$CH_2CH_2CH_2O(CH_2CH(CH_3)O)_nH$ where n is 1 to 5. Preferably, the R''' linking group contains from 3 to 10 atoms in addition to hydrogen atoms. There can be from 1 to 33 functional R radicals, preferably 3 to 10, and from 1 to 3 attached to a silicon atom.

As indicated above, the R' radical can be any hydrocarbon or substituted organic radical. Illustrative R' radicals present are alkyl radicals such as the methyl, ethyl, propyl, butyl, amyl, hexyl, octyl, decyl, dodecyl, octadecyl, and myricyl radicals; alkyenyl radicals such as the vinyl, allyl and hexenyl radicals; cycloalkyl radicals such as the cyclobutyl and cyclohexyl radicals; aryl radicals such as the phenyl, xenyl and naphthyl radicals; aralkyl radicals such as the benzyl and 2-phenyethyl radicals; alkaryl radicals such as the tolyl, xylyl and mesityl radicals; the corresponding halohydrocarbon radicals such as 3-chloropropyl, 4-bromobutyl, 3,3,3-trifluoropropyl, chlorocyclohexyl, bromophenyl, chlorophenyl, α,α,α-trifluorotolyl and the dichloroxenyl radicals; the corresponding cyanohydrocarbon radicals such as 3-cyanoethyl, 3-cyanopropyl and cyanophenyl radicals; the corresponding hydrocarbon radicals, such as ether hydrocarbon and ester hydrocarbon radicals such as —$(CH_2)_3OC_2H_5$, —$(CH_2)_3OCH_3$, —$(CH_2)_3COOC_2H_5$ and —$(CH_2)_3COOCH_3$, the corresponding thioether and thioester hydrocarbon radicals such as —$(CH_2)_3SC_2H_5$ and —$(CH_2)_3COSCH_3$; and nitrohydrocarbon radicals such as the nitrophenyl and 3-nitropropyl radicals.

It is preferred that the R' radical be an organic radical containing from 1 to 10 atoms. In the most preferred embodiment of this invention at least 90% of all the RI radicals are methyl radicals. There can be an average of from 0 to 2 R' radicals attached to the silicon atom, i.e., b has an average of from 0 to 2 in the above formula.

The R" radical in the siloxane compounds useful in this invention can also be an hydrocarbon or substituted hydrocarbon radical. The illustrative examples set forth above with respect to R' are equally applicable here. Likewise, the preferences set forth for R' above apply to the R" radical. There can be from 0 to 3 R" radicals, on the average, per silicon atom, i.e., c has an average value of from 1 to 3 in the above formula.

Most preferably, the R, R' and R" radicals are all organic radicals attached to the silicon atom by carbon to silicon bonds, by carbon-oxygen-silicon bonds or by carbon-sulfur-silicon bonds.

The polysiloxane compounds can be either solid or liquid in form and are required to be substantially insoluble in isocyanate liquid. In order to use a solid functional siloxane it would be necessary to dissolve, disperse or suspend the siloxane in one or more silicone surfactants. Hence, it is preferred that the functional siloxane employed be in liquid form. While the viscosity of the liquid siloxane can vary over a wide range, from 1 to 100000 centistokes, it is generally preferred that the viscosity be in the range of from 50 to 1000 centistokes. The molecular weight of the siloxanes can vary from 1000 to 30000, preferably 2000 to 15000, and most preferably 4000 to 8000.

Commercially available polysiloxane compounds useful in the present binder compositions include DC 1248 available from Dow Corning and Tego 412T available from Goldschmidt.

The preferred siloxane compounds are those set forth below, wherein the value listed for (a) is the equivalent weight, (b) is the combined formula weights of reactive radicals R expressed as percent of the molecular weight, and (c) is the combined formula weights of non-isocyanate reactive groups R'+R" expressed as percent of the molecular weight:

Polysiloxane I is a hydroxy functional polysiloxane polyether copolymer having the approximate formula: $(CH_3)_3SiO[Si(CH_3)_2O]_{66}[Si(CH_3)(C_3H_6O(CH_2CH(CH_3)O)_{2.5}H)O]_3Si(CH_3)_3$ having a molecular weight of about 6000, a hydroxy equivalent weight (a) of 2000, (b) is 11%, (c) is 35%, and a viscosity of 160 centistokes;

Polysiloxane II is a hydroxy functional thioether copolymer having the approximate formula: $[HOCH_2CH_2SCH_2(CH_3)_2SiO][Si(CH_3)_2O]_{70}[Si(CH_3)2CH_2CH_2SCH_2CH_2OH]$ having a hydroxy equivalent weight (a) of 2750, a molecular weight of 5500, a value for (b) of 4.3%, (c) is 39% and a viscosity of about 55 centistokes;

Polysiloxane III has an approximate formula as follows: $(CH_3)_3SiO[Si(CH_3)_2O]_{134}[Si(CH_3)(C_3H_6OC_2H_3(OH)CH_2OH)O]_{16}Si(CH_3)_3$ having a molecular weight of 13136, an equivalent weight (a) of 411, (b) is 16%, and (c) is 33%;

Polysiloxane IV has an approximate formula as follows: $(CH_3)_3SiO[Si(CH_3)_2O]_{63}[Si(CH_3)(C_3H_6OC_2H_3(OH)CH_2OH)O]_7Si(CH_3)_3$, having a molecular weight of 6154, an equivalent weight (a) of 440, (b) is 15%, and (c) is 34 %;

Polysiloxane V has an approximate formula: $(CH_3)_3SiO[Si(CH_3)_2O]_{65}[Si(CH_3)(C_3H_6OC_2H_3(OH)CH_2OH)\ O]_5Si(CH_3)_3$ having a molecular weight of 5918, an equivalent weight (a) of 592, (b) is 11%, and (c) is 34%;

Polysiloxane VI has an approximate formula: $(CH_3)_3SiO[Si(CH_3)_2O]_{56}[Si(CH_3)(C_3H_6OC_2H_3(OH)CH_2OH)O]_{14}Si(CH_3)_3$ having a molecular weight of 6980, an equivalent weight (a) of 249, (b) is 26%, and (c) is 28%;

Polysiloxane VII has an approximate formula: $(CH_3)CH(OH)CH_2OC_3H_6Si(CH_3)_2O[Si(CH_3)_2O]_{39}Si(CH_3)_2C_3H_6OC_2H_4(OH)CH_3$ having a molecular weight of 6962, an equivalent weight (a) of 3481, (b) is 3.4%, and (c) is 39%;

Polysiloxane VIII has an approximate formula: $(CH_3)_3SiO[Si(CH_3)_2O]_{66}[(CH_3)Si(C_4H_8-PH-NH(C_3H_7)O]_3Si(CH_3)_3$ where PH=phenylene, having a molecular weight of 5782, and an equivalent weight (a) of 1927, (b) is 9.9%, and (c) is 37%;

Polysiloxane IX has an approximate formula: $(CH_3)_3SiO[Si(CH_3)_2O]_{55}[HOCH_2CHOHCHOHCH(CH_2OH)CH(CH_2OH)Si(CH_3)O]_{14}Si(CH_3)_3$ having a molecular weight of 7550, an equivalent weight (a) of 108, (b) is 33%, and (c) is 26%;

Polysiloxane X has an approximate formula: $(CH_3)_3SiO[Si(CH_3)_2O]_{61}[(CH_3)Si(C_3H_6OCH_2CH(OH)CH_2OH)O]_9Si(CH_3)_3$ having a molecular weight of 6390, an equivalent weight (a) of 355, (b) is 19%, and (c) is 32%.

In view of the relatively limited stability of the polysiloxane compounds in the polyisocyanates, the components should be blended batchwise just prior to application to the lignocellulosic materials. Preferably these compositions are prepared by supplying the polyisocyanate containing compatibilising agent and organic compound derived from Group IVB metal on the one hand and the polysiloxane on the other hand as separate components and mixing them immediately prior to application to the lignocellulosic material.

Other preferred conventional release agents to be used according to the present invention are polyolefin waxes, especially functionalised polyolefin waxes, the term 'functionalised' meaning polyolefins containing e.g. free hydroxyl, carboxylic acid or ester groups, including oxidised polyolefins. A preferred polyolefin is polyethylene. Preferably oxidised homopolymers of polyethylene or copolymers of ethylene and vinylacetate and saponified α,β-unsaturated carboxylic acids such as those based on acrylic acid are used. Preferably the polyethylene wax has a melting temperature in the range 80 to 100° C., a viscosity in the range 25 to 50 cPs at 140° C. and a hardness in the range 80 to 98 dmm to ASTM D5 and is of low crystallinity. The number average molecular weight of the polyethylene is preferably in the range 500 to 4000. A particularly preferred polyethylene wax is A-C 6702 available from Allied Signal.

In the case of functionalised polyolefin waxes these can be pre-reacted with some of the Group IVB metal compounds of the present invention, in particular the titanium chelates.

The pre-reaction proceeds as follows. The functionalised polyolefin wax is melted at about 90° C. and reacted at this temperature with the organic compound derived from a Group IVB metal. A compatibilising agent (in the form of a compound according to formula II) is added to this reaction mixture before the mixture is cooled down to room temperature. The product formed is a pasty liquid which can be easily stirred into a polyisocyanate. The polyisocyanate composition formed in such a way is a stable dispersion at room temperature and comprises an amount of polyolefin wax of between 0.1 and 10%, preferably between 0.5 and 6%, most preferably between 1 and 4% by weight based on the polyisocyanate. The organic compound derived from a Group IVB metal is preferably present in an amount varying between 0.2 and 3%, most preferably between 0.2 and 1.5% by weight based on the polyisocyanate and the compatibilising agent is preferably present in an amount varying between 1 and 4% by weight based on the polyisocyanate.

In the case of non-functionalised polyolefin waxes, these can be added separately to the lignocellulosic material in the form of an aqueous emulsion, having a solids content of between 5 and 40% by weight, preferably between 5 and 20% by weight, most preferably between 5 and 15% by weight. The amount of polyolefin wax emulsion used in the process of the present invention is between 0.5 and 30% by weight based on the polyisocyanate composition containing the Group IVB metal compound and the compatibilising agent.

The polyisocyanate compositions of the present invention are extremely effective in minimising unwanted adhesion to caul plates, press plates and other surfaces with which the treated lignocellulosic material may come into contact. Their release performance is improved compared to polyisocyanate compositions of the prior art, as well as the obtained board properties, especially after humid ageing.

The polyisocyanates for use in the composition of the present invention may be any organic polyisocyanate compound or mixture of organic polyisocyanate compounds, provided said compounds have at least 2 isocyanate groups. Organic polyisocyanates include diisocyanates, particularly aromatic diisocyanates, and isocyanates of higher functionality.

Examples of organic polyisocyanates which may be used in the composition of the present invention include aliphatic isocyanates such as hexamethylene diisocyanate; and aromatic isocyanates such as m- and p-phenylene diisocyanate, tolylene-2,4- and -2,6-diisocyanate, diphenylmethane-4,4'- diisocyanate, chlorophenylene-2,4-diisocyanate, naphthylene-1,5-diisocyanate, diphenylene-4,4'-diisocyanate, 4,4'-diisocyanate-3,3'-dimethyldiphenyl, 3-methyldiphenylmethane-4,4'-diisocyanate and diphenyl ether diisocyanate; and cycloaliphatic diisocyanates such as cyclohexane-2,4- and -2,3-diisocyanate, 1-methylcyclohexyl-2,4- and -2,6-diisocyanate and mixtures thereof and bis-(isocyanatocyclohexyl)methane and triisocyanates such as 2,4,6-triisocyanatotoluene and 2,4,4-triisocyanatodiphenylether.

Modified polyisocyanates containing isocyanurate, carbodiimide or uretonimine groups may be employed as well. Further blocked polyisocyanates, like the reaction product of a phenol or an oxime and a polyisocyanate, may be used, having a deblocking temperature below the temperature applied when using the polyisocyanate composition.

The organic polyisocyanate may also be an isocyanate-ended prepolymer made by reacting an excess of a diisocyanate or higher functionality polyisocyanate with a polyol.

Water-emulsifiable organic polyisocyanates like those described in UK patent no. 1444933, in European patent publication no. 516361 and in PCT patent publication no. 91/03082 can also be used.

Mixtures of isocyanates may be used, for example a mixture of tolylene diisocyanate isomers such as the commercially available mixtures of 2,4- and 2,6-isomers and also the mixture of di- and higher polyisocyanates produced by phosgenation of aniline/formaldehyde condensates.

Such mixtures are well-known in the art and include the crude phosgenation products containing methylene bridged polyphenyl polyisocyanates, including diisocyanate, triisocyanate and higher polyisocyanates together with any phosgenation by-products.

Preferred isocyanates to be used in the present invention are those wherein the isocyanate is an aromatic diisocyanate or polyisocyanate of higher functionality such as a pure diphenylmethane diisocyanate or mixture of methylene bridged polyphenyl polyisocyanates containing diisocyanates, triisocyanates and higher functionality polyisocyanates.

Methylene bridged polyphenyl polyisocyanates are well known in the art. They are prepared by phosgenation of corresponding mixtures of polyamines obtained by condensation of aniline and formaldehyde. For convenience, polymeric mixtures of methylene bridged polyphenyl polyisocyanates containing diisocyanate, triisocyanate and higher functionality polyisocyanates are referred to hereinafter as polymeric MDI.

Preferably the polyisocyanate is liquid at room temperature.

In order to further improve the storage stability of the polyisocyanate composition of the present invention an inert diluent may be added to the composition. Suitable diluents include plasticizers of the type mentioned in "Taschenbuch der Kunststoff-Additive", Ed. by R. Gachter and H. Muller, Carl Hanser Verlag Munchen, third edition, 1989. Preferred diluents are phthalates, aliphatic carboxylates, fatty acid esters, Linseed oil and Soybean oil. A particularly preferred diluent is Priolube 1403 available from Unichema being methyloleate. These diluents are added in amounts of from 1 to 40 parts by weight per 100 parts by weight of polyisocyanate and preferably in amounts of from 1 to 15 parts by weight per 100 parts by weight of polyisocyanate.

The composition further may comprise conventional additives like flame retardants, lignocellulosic preserving agents, fungicides, waxes, sizing agents, fillers, surfactants, thixotropic agents and other binders like formaldehyde condensate adhesive resins and lignin (optionally in combination with a lignin solvent such as described in PCT Patent Application No. EP96/00924).

A particularly preferred additive to be used in the polyisocyanate composition of the present invention is a coupling agent such as an organofunctional silane (for example, Dynasylan AMEO, available from Huels). Adding such a coupling agent to the polyisocyanate composition leads to improved board properties. The organofunctional silane coupling agents are used in amounts ranging from 0.01 to 3%, preferably from 0.1 to 2% by weight based on the polyisocyanate.

The polyisocyanate composition of the present invention can be made by simply mixing the ingredients at room temperature.

The present invention is also concerned with a process for preparing lignocellulosic bodies by bringing lignocellulosic parts into contact with the present polyisocyanate composition and by pressing this combination.

Therefore the present invention also provides a process for binding lignocellulosic material comprising the steps of
a) bringing said lignocellulosic material in contact with the present polyisocyanate composition and
b) subsequently allowing said material to bind.

The lignocellulosic bodies are prepared by bringing the lignocellulosic parts into contact with the polyisocyanate composition like by means of mixing, spraying and/or spreading the composition with/onto the lignocellulosic parts and by pressing the combination of the polyisocyanate composition and the lignocellulosic parts, preferably by hot-pressing, normally at 150° C. to 250° C. and 2 to 6 MPa specific pressure.

Such binding processes are commonly known in the art.

In waferboard manufacture the lignocellulosic material and the polyisocyanate composition may be conveniently mixed by spraying the present polyisocyanate composition on the lignocellulosic material while it is being agitated.

The lignocellulosic material after treatment with the polyisocyanate composition is placed on caul plates made of aluminium or steel which serve to carry the furnish into the press where it is compressed to the desired extent usually at a temperature between 150° C. and 250° C. At the start of a manufacturing run it may be helpful, but not essential, to condition the press plates by spraying their surfaces with an external release agent such as the above described polysiloxane compounds or to increase the cycle time of the first press load. A preconditioned press may then be used many times in the process of the invention without further treatment.

While the process is particularly suitable for the manufacture of waferboard known extensively as oriented strand board and will be largely used for such manufacture, the process may not be regarded as limited in this respect and can also be used in the manufacture of medium density fiberboard, particle board (also known as chipboard) and plywood.

Thus the lignocellulosic material used can include wood strands, woodchips, wood fibers, shavings, veneers, wood wool, cork, bark, sawdust and like waste products of the wood working industry as well as other materials having a lignocellulosic basis such as paper, bagasse, straw, flax, sisal, hemp, rushes, reeds, rice hulls, husks, grass, nutshells and the like. Additionally, there may be mixed with the lignocellulosic materials other particulate or fibrous materials such as grinded foam waste (for example, grinded polyurethane foam waste), mineral fillers, glass fiber, mica, rubber, textile waste such as plastic fibers and fabrics.

When the polyisocyanate composition is applied to the lignocellulosic material, the weight ratio of polyisocyanate/lignocellulosic material will vary depending on the bulk density of the lignocellulosic material employed. Therefore, the polyisocyanate compositions may be applied in such amounts to give a weight ratio of polyisocyanate/lignocellulosic material in the range of 0.1:99.9 to 20:80 and preferably in the range of 0.5:99.5 to 10:90.

If desired, other conventional binding agents, such as formaldehyde condensate adhesive resins, may be used in conjunction with the polyisocyanate composition.

More detailed descriptions of methods of manufacturing waferboard and similar products based on lignocellulosic material are available in the prior art. The techniques and equipment conventionally used can be adapted for use with the polyisocyanate compositions of the present invention.

The sheets and moulded bodies produced from the polyisocyanate compositions of the present invention have excellent mechanical properties and they may be used in any of the situations where such articles are customarily used.

The invention is illustrated but not limited by the following examples. SUPRASEC is a trademark of Imperial Chemical Industries.

EXAMPLE 1

A composition comprising 100 pbw of polyisocyanate (polymeric MDI, SUPRASEC 1042, available from Imperial Chemical Industries) and 1 pbw of ethoxyisopropoxy titanium bisacetylacetonate (Ti-aca 105 available from Hüls) was prepared.

This composition was used to bond soft wood fibres at 6% binder loading based on dry wood. Board size: 180×180×6 mm, board density: 700 kg/m$^3$. Press platen temperature: 200° C. Cure time: 16 s/mm. Mat moisture content: ±12%.

Perfect release was obtained without any pretreatment or coating of the press platens.

EXAMPLE 2

28.4 g (0.1 mole) titanium tetraisopropoxide and 56.4 g (0.2 mole) oleic acid were mechanically stirred in a glass vessel under a nitrogen atmosphere at ambient. Subsequently the reaction mixture was heated up to 120° C. at which temperature ca. 11 ml isopropanol was slowly distilled off over 1 hour (yield 92%). After the isopropanol had been distilled off the dark red liquid reaction product was allowed to cool down and stored at ambient under a nitrogen blanket until use.

A composition comprising 100 pbw of polyisocyanate (polymeric MDI, SUPRASEC 1042, available from Imperial Chemical Industries) and 3 pbw of the above obtained diisopropoxy titanium dioleate was prepared.

This composition was used to bond soft wood fibres at 6% binder loading based on dry wood (same conditions as in example 1).

Perfect release was obtained without any pretreatment or coating of the press platens.

EXAMPLE 3

A composition comprising 100 pbw of polyisocyanate (polymeric MDI, SUPRASEC DNR, available from Imperial Chemical Industries), 3 pbw of Ti-aca 105 (available from Hüls), 3 pbw of cetylacetoacetate and 3 pbw of methyloleate was prepared. The storage stability of this composition is improved over the compositions of examples 1 and 2.

This composition was used to bond soft wood strands at 9% loading based on dry wood. Boards of 12×450×450 mm and density 720 kg/m$^3$ were made with face layers bound with the present composition and a core layer bound with a polyisocyanate composition (SUPRASEC 1042) containing a wax emulsion (SPG 60 available from Condea Chemie) at 6% loading based on dry wood. Ratio face/core/face layers: 20/60/20; moisture content face layers: 14%; moisture content core layer: 9%. Press platen temperature: 170° C. Perfect release was obtained from the first board on, staying steady and constant for over 20 consecutive repeats. No wood failure (coverage of the press platens with wood particles) was visible after the trial.

EXAMPLES 4–6

A composition comprising 100 pbw of polyisocyanate (polymeric MDI, SUPRASEC DNR, available from Imperial Chemical Industries), 0.5 pbw of Ti-aca 105 (available from Hüls), 3 pbw of cetylacetoacetate, 10 pbw of methyloleate and 11 pbw of zinc stearate (Zincstearate N available from Bouquillon) was prepared (example 4). Viscosity of this composition after 15 days storage at 30° C. is 820 cP.

As comparison a composition comprising 100 pbw of polyisocyanate (polymeric MDI, SUPRASEC DNR, available from Imperial Chemical Industries), 0.3 pbw of tin bismaleate (Stanclere T-57 available from Acros Chemicals), 3 pbw of cetylacetoacetate, 10 pbw of methyloleate and 11 pbw of zinc stearate was prepared (example 5) and a composition comprising 100 pbw of polyisocyanate (polymeric MDI, SUPRASEC DNR, available from Imperial Chemical Industries), 3 pbw of cetylacetoacetate, 10 pbw of methyloleate and 11 pbw of zinc stearate (Zincstearate N available from Bouquillon) (example 6). Viscosities of these compositions after 15 days storage at 30° C. is respectively 760 cP and 500 cP.

Boards were made from these compositions in the same way as described in example 3 above.

Release from the press platens was checked (for a consecutive run of 20 boards) and quoted: 0 being complete sticking (board cannot be removed without destruction of the board), 1 being sticking with wood failure higher than 50%, 2 being sticking with wood failure less than 50% but higher than 25%, 3 being sticking with wood failure less than 25% but higher than 5%, 4 being sticking with wood failure less than 5% (little force needed to remove the board), 4.5 being sticking without wood failure (no effort needed to remove the board) and 5 being perfect release (the board releases spontaniously).

The following board properties were measured: internal bond strength (according to standards EN 319 and EN 1087) for classification of V20 and V100 as in standard DIN 68763, and swelling after 24 hours (according to standard EN 317).

The results are given in Table 1. The numbers in the second column (release) show the range of values observed during 20 repetitions. The numbers in column 3 (wood failure) reflect the cumulative wood failure coverage observed after 20 pressing cycles.

TABLE 1

| Example No. | Release | Wood failure (%) | V20 IB (kPa) | V100 IB (kPa) | Swelling (%) |
|---|---|---|---|---|---|
| 4 | 5 | 0 | 1050 | 133 | 12 |
| 5 | 5/4 | 30 | 696 | 62 | 23 |
| 6 | 5/2.5 | 50 | 864 | 163 | 12 |

These results show that using compositions according to the invention (example 4) leads to improved release and improved dry strength properties of the obtained boards compared to compositions of the prior art (examples 5 and 6).

EXAMPLES 7–10

28.4 g (0.1 mole) titanium tetraisopropoxide and 130.7 g of a 50 wt % solution of cetyl acetoacetate in methyl oleate were mechanically stirred in a glass vessel under a nitrogen atmosphere at ambient. Subsequently the reaction mixture was heated up to 120° C. and ca. 10 ml isopropanol was slowly distilled off over 1.5 hour (yield 85%). After removal of the isopropanol the red coloured reaction mixture was allowed to cool down and stored at ambient under a nitrogen blanket until use. The final product is a 69 wt % solution of the titanium chelate in methyl oleate.

A composition comprising 100 pbw of polyisocyanate (polymeric MDI, SUPRASEC DNR, available from Imperial Chemical Industries), 3 pbw of Ti-aca 105, 1.3 pbw of benzylchloride and 10 pbw of methyloleate was prepared (example 7).

Similarly a composition comprising 100 pbw of polyisocyanate (polymeric MDI, SUPRASEC DNR, available from Imperial Chemical Industries), 3 pbw of Ti-aca 105, 3 pbw of cetylacetoacetate and 10 pbw of methyloleate was prepared (example 8), a composition comprising 100 pbw of polyisocyanate (polymeric MDI, SUPRASEC DNR, available from Imperial Chemical Industries), 6.5 pbw of the above obtained diisopropoxy titanium bis (cetylacetoacetate), 3 pbw of cetylacetoacetate and 10 pbw of methyloleate (example 9) and a composition comprising 100 pbw of polyisocyanate (polymeric MDI, SUPRASEC DNR, available from Imperial Chemical Industries), 5.8 pbw of diisopropoxy titanium dioleate, 3 pbw of cetylacetoacetate and 10 pbw of methyloleate (example 10).

Stability of these compositions was determined by measuring the viscosity at 25° C. (in mPa s) initially and after storage at 30° C. for 4 days, 8 days, 16 days and 30 days.

The results are given in Table 2.

TABLE 2

| Example | Viscosity initial | Viscosity 4 days | Viscosity 8 days | Viscosity 6 days | Viscosity 30 days |
|---|---|---|---|---|---|
| 7 | 740 | 1850 | 2380 | 3300 | |
| 8 | 349 | 2500 | 3500 | | |
| 9 | 152 | 340 | — | 633 | 1180 |
| 10 | 173 | 416 | — | 4544 | |

These results show that the stability of the composition is strongly affected by the nature of the chelating agents used to prepare the titanium chelates and by the nature of the stabilising agent.

EXAMPLES 11–13

A composition comprising 100 pbw of polyisocyanate (polymeric MDI, SUPRASEC DNR, available from Imperial Chemical Industries), 1 pbw of Ti-aca 105, 3 pbw of cetylacetoacetate, 3 pbw of methyloleate and 2 pbw of polysiloxane Tego 412T (available from Goldschmidt) was prepared (example 11).

Similarly a composition comprising 100 pbw of polyisocyanate (polymeric MDI, SUPRASEC DNR, available from Imperial Chemical Industries) and 4 pbw of polysiloxane Tego 412T was prepared (example 12) and a composition comprising 100 pbw of SUPRASEC DNR and 1 pbw of Ti-aca 105 (example 13).

Both these compositions were used to bond softwood strands at 9% binder loading based on dry wood. Boards of 12×450×450 mm and density 720 kg/m³ were made with face layers bound with the above compositions and a core layer bound with a polyisocyanate (SUPRASEC 1042 available from Imperial Chemical Industries) containing a wax emulsion (SPG 60 available from Condea Chemie) at 6% loading based on dry wood. Ratio face/core/face layers: 20/60/20; moisture content face layers: 14%; moisture content core layer: 9%. Press platen temperature: 170° C.

Release from the press platens was checked (for a consecutive run of 20 boards) and quoted: 0 being complete sticking (board cannot be removed without destruction of the board), 1 being sticking with wood failure higher than 50%, 2 being sticking with wood failure less than 50% but higher than 25%, 3 being sticking with wood failure less than 25% but higher than 5%, 4 being sticking with wood failure less than 5% (little force needed to remove the board), 4.5 being sticking without wood failure (no effort needed to remove the board) and 5 being perfect release (the board releases spontaniously).

The following board properties were measured: internal bond strength (according to standards EN 319 and EN 1087) for classification of V20 and V100 as in standard DIN 68763, and swelling after 24 hours (according to standard EN 317).

The results are given in Table 3. The numbers in the second column (release) show the range of values observed during 20 repetitions (first board/second to 20th board). The numbers in column 3 (wood failure) reflect the cumulative wood failure coverage observed after 20 pressing cycles.

TABLE 3

| Example No. | Release | Wood failure (%) | V20 IB (kPa) | V100 IB (kPa) | Swelling (%) |
|---|---|---|---|---|---|
| 11 | 4.5/5 | 0 | 925 | 280 | 15 |
| 12 | 2/5–4.5 | 1 | 1030 | 160 | 13 |
| 13 | 4/4.5 | 45 | | | |

The results in Table 3 show that the use of Titanium chelates in combination with polysiloxanes is beneficial to the boards wet strength properties and to the release compared with boards made using only polysiloxanes as internal release agents or using only Titanium chelates.

Example 12 shows that the first board does not release well without prepriming the press. Example 11 gives a 4.5 for the first board and a complete series of consistent 5's following without any pretreatment of the press.

EXAMPLES 14–16

A composition comprising 100 pbw of polyisocyanate (polymeric MDI, RUBINATE 1840, available from Imperial Chemical Industries), 0.5 pbw of Ti-aca 105, 1.5 pbw of cetylacetoacetate, 1.5 pbw of methyloleate and 2 pbw of Tego 412T (available from Goldschmidt) was prepared (example 14).

Similarly a composition comprising 100 pbw of polyisocyanate (polymeric MDI, RUBINATE 1840, available from Imperial Chemical Industries) and 2 pbw of Ti-aca 105, 1.5 pbw of cetylacetoacetate, 1.5 pbw of methyloleate and 0.5 pbw of Tego 412T was prepared (example 15) and a composition comprising solely 100 pbw of RUBINATE 1840 and 2 pbw of Tego 412T (example 16).

These compositions were used to bond aspen strands at 4% binder loading based on dry wood. Boards of 6×450× 450 mm and an average density of 630 kg/m³ were made only using material for face layers and bound with the above compositions and addition of 1% slack wax based on dry wood. Moisture content after blending: 6–8%. Press platen temperature: 200° C.

Release from the press platens was checked (for a consecutive run of 20 boards) and individually quoted as above. The results are shown in Table 4.

TABLE 4

| Example No. | Release (individual quoting) |
|---|---|
| 14 | 5/5/5/5/5/5/5/5/5/5/5/5/5/5/5/5/5/5/5/5 |
| 15 | 5/5/5/5/5/5/5/5/5/5/5/5/5/5/5/5/5/5/5/5 |
| 16 | 4/4/5/5/5/4/5/4/5/5 |

EXAMPLES 17–20

A composition comprising 100 pbw of polyisocyanate (polymeric MDI, SUPRASEC DNR, available from Imperial Chemical Industries), 0.25 pbw of Ti-aca 105, 3 pbw of cetylacetoacetate, 10 pbw of methyloleate, 11 pbw of zinc stearate and 1 pbw of 3-aminopropyltriethoxysilane (Dynasylan AMEO available from Huels) was prepared (example 17).

Similarly a composition comprising 100 pbw of polyisocyanate (polymeric MDI, SUPRASEC DNR, available from Imperial Chemical Industries), 3 pbw of cetylacetoacetate, 10 pbw of methyloleate and 11 pbw of zinc stearate (example 18) and a composition comprising 100 pbw of SUPRASEC DNR, 0.25 pbw of Ti-aca 105, 3 pbw of cetylacetoacetate, 10 pbw of methyloleate and 11 pbw of zinc stearate (example 19! was prepared.

These compositions were used to bond softwood strands at 9% binder loading based on dry wood. Boards of 12×450× 450 mm and density 720 kg/m$^3$ were made with face layers bound with the above compositions and a core layer bound with a polyisocyanate (SUPRASEC DNR available from Imperial Chemical Industries) containing a wax emulsion (SPG 60 available from Condea Chemie) at 6% loading based on dry wood. Ratio face/core/face layers: 20/60/20; moisture content face layers: 14%; moisture content core layer: 9%. Press platen temperature: 170° C.

A supplemental board was made using SUPRASEC DNR at 7% loading both in core and face layers (example 20).

Release from the press platens was checked (for a consecutive run of 20 boards) and quoted: 0 being complete sticking (board cannot be removed without destruction of the board), 1 being sticking with wood failure higher than 50%, 2 being sticking with wood failure less than 50% but higher than 25%, 3 being sticking with wood failure less than 25% but higher than 5%, 4 being sticking with wood failure less than 5% (little force needed to remove the board), 4.5 being sticking without wood failure (no effort needed to remove the board) and 5 being perfect release (the board releases spontaniously).

The following board properties were measured: internal bond strength (according to standards EN 319 and EN 1087) for classification of V20 and V100 as in standard DIN 68763, and swelling after 24 hours (according to standard EN 317).

The results are given in Table 5. The numbers in the second column (release) show the range of values observed during 20 repetitions (first board/second to 20th board). The numbers in column 3 (wood failure) reflect the cumulative wood failure coverage observed after 20 pressing cycles.

TABLE 5

| Example No. | Release | Wood failure (%) | V20 IB (kPa) | V100 IB (kPa) | Swelling (%) |
|---|---|---|---|---|---|
| 17 | 5 | 2 | 729 | 138 | 10.1 |
| 18 | 5/2.5 | 50 | 681 | 92 | 11.1 |
| 19 | 5 | 2 | 698 | 90 | 11.7 |
| 20 | — | — | 906 | 103 | 10.4 |

The results in Table 5 show that the use of an aminosilane in combination with a titanium acetylacetonate is beneficial to the board properties, especially wet strength (V100) properties. The decline in board properties due to the use of zinc stearate as internal release agent is largely compensated for by the use of the silane coupling agent.

EXAMPLES 21–24

60 g of oxidized polyethylene (AC-6702 available from Allied Signal) and 120 g of a 50 wt % solution of cetylacetocaetate in methyloleate were mechanically stirred in a glass vessel under a nitrogen atmosphere and heated up to 90° C. A clear solution was obtained. Subsequently 20 g of Ti-aca 105 was slowly added whilst stirring and keeping the temperature at 90° C. After completion of the Ti-aca 105 addition the reaction mixture was allowed to cool down to ambient. The reaction product (dark red paste-like material) (I) was stored at ambient until use.

100 pbw polyisocyanate (polymeric MDI, SUPRASEC DNR, available from Imperial Chemical Industries) was mechanically stirred in a glass vessel at ambient under a nitrogen atmosphere. Subsequently 10 pbw of the reaction product (I) was heated up to 50° C. and slowly added to the polyisocyanate. Stirring was continued for ca. 15 minutes and a homogeneous dispersion was obtained. The resultant polyisocyanate composition was stored at ambient under a nitrogen blanket until use (example 22).

A composition comprising 100 pbw of polyisocyanate (polymeric MDI, SUPRASEC DNR, available from Imperial Chemical Industries), 0.5 pbw of Ti-aca 105, 3 pbw of cetylacetoacetate, 3 pbw of methyloleate was prepared. The composition was used to bond softwood strands at 8% binder loading based onb dry wood. Following the binder addition a PE wax emulsion (30% solids content) was sprayed separately on the wooden strands, the amount of emulsion sprayed such to achieve a PE wax solid content of 10% by weight based on the polyisocyanate composition (or 0.8% based on dry wood). Boards of 12×450×450 mm and density 720 kg/m$^3$ were made with face layers prepared as described above and a core layer bound with a polyisocyanate (SUPRASEC DNR available from Imperial Chemical Industries) containing a wax emulsion (SPG 60 available from Condea Chemie) at 6% loading based on dry wood. Ratio face/core/face layers: 20/60/20; moisture content face layers: 14%; moisture content core layer: 9%. Press platen temperature: 170° C. (example 21)

A composition comprising 100 pbw of SUPRASEC DNR, 3 pbw of cetylacetoacetate, 3 pbw of methyloleate and 3 pbw of PE-wax AC 6702 (example 23) and a composition comprising 100 pbw of SUPRASEC DNR and 1 pbw of Ti-aca 105 (example 24) was also prepared.

The compositions of examples 22 to 24 were used to bond softwood strands at 8% binder loading based on dry wood. Boards of 12×450×450 mm and density 720 kg/m$^3$ were made with face layers bound with the above compositions and a core layer bound with a polyisocyanate (SUPRASEC DNR available from Imperial Chemical Industries) containing a wax emulsion (SPG 60 available from Condea Chemie) at 6% loading based on dry wood. Ratio face/core/face layers: 20/60/20; moisture content face layers: 14%; moisture content core layer: 9%. Press platen temperature: 170° C.

Release from the press platens was checked (for a consecutive run of 10 boards) and quoted: 0 being complete sticking (board cannot be removed without destruction of the board), 1 being sticking with wood failure higher than 50%, 2 being sticking with wood failure less than 50% but higher than 25%, 3 being sticking with wood failure less than 25% but higher than 5%, 4 being sticking with wood failure less than 5% (little force needed to remove the board), 4.5 being sticking without wood failure (no effort needed to remove the board) and 5 being perfect release (the board releases spontaniously).

The following board properties were measured: internal bond strength (according to standards EN 319 and EN 1087) for classification of V20 and V100 as in standard EN 320, and swelling after 24 hours (according to standard EN 317).

The results are given in Table 6. The numbers in the second column (release) show the range of values observed during 10 repetitions. The numbers in column 3 (wood failure) reflect the cumulative wood failure coverage observed after 10 pressing cycles.

TABLE 6

| Example No. | Release | Wood failure (%) | V20 IB (kPa) | V100 IB (kPa) | Swelling (%) |
|---|---|---|---|---|---|
| 21 | 5 | 0 | 925 | 490 | 10.4 |
| 22 | 5 | 1 | — | — | — |
| 23 | 1 | 100 | — | — | — |
| 24 | 4/4.5 | 45 | — | — | — |

In example 23 release was only tested for the first board.

What is claimed is:

1. A binder for lignocellulosic material comprising:

(a) a polyisocyanate; and (b) an organic compound derived from a metal of Group IVB of the Periodic Table of Elements;

wherein said organic compound is selected from the group consisting of (i) chelate complexes with the metal as central atom and with at least one polydentate ligand;

(ii) metal carboxylates; and (iii) metal alkoxides.

2. The binder of claim 1 wherein the Group IVB metal is titanium or zirconium.

3. The binder of claim 1 wherein the carboxylate or alkoxide is derived from a saturated or unsaturated, aliphatic or cycloaliphatic or aromatic carboxylic acid or alcohol having from 1 to 30 carbon atoms.

4. The binder of claim 1 wherein the at least one polydentate ligand is a β-dicarbonyl compound.

5. The binder according to claim 4 wherein said β-dicarbonyl compound is acetylacetonate or an acetoacetate.

6. The binder of claim 1 wherein the chelate complex corresponds to the following formula (I)

$$R^1-\underset{\underset{X^3}{\overset{\overset{X^1}{\|}}{C}}}{C}-CH=\underset{\underset{R^3-(O)_{y'}}{}}{\overset{\overset{X^2}{\|}}{C}}-(O)_y-R^2 \quad R^5-(C)_{z'}-O-\underset{\underset{X^4}{}}{\overset{}{M}}-O-(C)_z-R^6 \quad R^3-(O)_{y'}-\underset{\underset{X^3}{\|}}{C}=CH-\underset{\underset{X^6}{\|}}{C}-R^4 \quad (I)$$

wherein $X^1$, $X^2$, $X^3$, $X^4$, $X^5$ and $X^6$ (same or different) represent O or S or N, z and z' (same or different) are 0 or 1, y and y' (same or different) are 0 or 1, $R^1$ and $R^4$ (same or different) represent an aliphatic hydrocarbon radical having 1 to 30 carbon atoms, $R^2$ and $R^3$ (same or different) represent an aliphatic hydrocarbon radical having 1 to 30 carbon atoms, $R^5$ and $R^6$ (same or different) represent an aliphatic hydrocarbon radical having 1 to 30 carbon atoms and M represents Ti or Zr or Hf.

7. The binder according to claim 6 wherein M is Ti or Zr.

8. The binder according to claim 6 wherein $X^1$, $X^2$, $X^3$, $X^4$, $X^5$ and $X^6$ all represent O.

9. The binder according to claim 6 wherein $R^5$ and $R^6$ contain from 1 to 20 carbon atoms and z and z' are both 0.

10. The binder according to claim 6 wherein $R^1$, $R^2$, $R^3$ and $R^4$ contain from 1 to 20 carbon atoms.

11. The binder according to claim 10 wherein y and y' are both 0 and $R^1$, $R^2$, $R^3$ and $R^4$ contain from 1 to 3 carbon atoms.

12. The binder according to claim 10 wherein y and y' are both 0, $R^2$ and $R^3$ contain from 1 to 3 carbon atoms and $R^1$ and $R^4$ contain from 10 to 18 carbon atoms.

13. The binder according to claim 1 wherein the chelate complex corresponds to the following formula (Ia)

$$(R^7O)_aM(R^8C(O)CHC(O)R^9)_b \quad (Ia)$$

wherein M represents Ti or Zr, $R^7$ represents an alkoxy or carboxy group, $R^8$ represents an alkyl or aryl group, $R^9$ represents an alkoxy, aryloxy, alkyl or aryl group, a is 4-b and b is 1 or 2 in case of M being Ti and b is 1, 2, 3 or 4 in case of M being Zr.

14. The binder according claim 13 wherein said organic compound is used in an amount varying between 0.1 and 10% by weight based on the polyisocyanate.

15. The binder according to claim 14 wherein said organic compound is used in an amount varying between 0.2 and 7% by weight based on the polyisocyanate.

16. The binder of claim 1 further comprising a compatibilising agent being a compound corresponding to general formula (II) or the reaction product of an organic mono- or polyfunctional isocyanate therewith $$R-(O)_n-\underset{\underset{Y_1}{\|}}{C}-CH_2-\underset{\underset{Y_2}{\|}}{C}-(O)_{n'}-R^1 \quad (II)$$

wherein $Y_1$ and $Y_2$ (same or different) represent O or S; n and n' (same or different) represent an integer of from 0 to 1, R and R' (same or different) represent an aliphatic hydrocarbon radical containing from 1 to 30 carbon atoms and wherein the sum of the total number of carbon atoms of R and R' is between 7 and 40.

17. The binder according to claim 16 wherein $Y_1$ and $Y_2$ both represent O, n equals 0, R is a alkyl radical containing 1 or 2 carbon atoms, n' equals 1 and $R^1$ is an alkyl radical containing from 8 to 18 carbon atoms.

18. The binder according to claim 17 wherein the compound corresponding to formula (II) is decyl acetoacetate, cetyl acetoacetate or stearyl acetoacetate.

19. The binder according to claim 16 wherein the organic isocyanate with which the compound according to formula (II) can be reacted to form the compatibilising agent is diphenylmethane diisocyanate or a mixture of methylene bridged polyphenyl polyisocyanates.

20. The binder according to claim 16 wherein the compatibilising agent (in the form of the compound corresponding to formula (II)) is used in an amount varying between 1.5 and 7% by weight based on the polyisocyanate.

21. The binder of claim 1 further comprising a metal carboxylate derived from a metal of Group IA, IIA, IIIA, IB, IIB, IVA, VA or VIII of the Periodic Table of Elements.

22. The binder according to claim 21 wherein said Group IA, IIA, IIIA, IB, IIB, IVA, VA or VIII metal is Zn.

23. The binder according to claim 22 wherein said metal carboxylate is zinc stearate.

24. The binder according to any one of claim 21 wherein said metal carboxylate is used in an amount varying between 5 and 15% by weight based on the polyisocyanate.

25. The binder of claim 1 further comprising a release agent.

26. The binder according to claim 25 wherein said release agent is used in an amount varying between 0.5 and 6% by weight based on the polyisocyanate.

27. The binder according to claim 25 wherein said release agent is a polysiloxane.

28. The binder according to claim 25 wherein said release agent is a functionalised polyolefin wax.

29. The binder according to claim 28 wherein said polyolefin is polyethylene.

30. The binder according to claim 25 wherein a compatibilising agent is used in an amount varying between 1 and 4% by weight based on the polyisocyanate, said compatibilizing agent being a compound corresponding to general formula (II)

$$R-(O)_n-\underset{\underset{Y_1}{\|}}{C}-CH_2-\underset{\underset{Y_2}{\|}}{C}-(O)_{n'}-R^1 \quad (II)$$

or the reaction product of an organic mono- or polyfunctional isocyanate therewith, wherein $Y_1$ and $Y_2$ (same or different) represent O or S; n and n' (same or different) represent an integer of from 0 to 1, R and R' (same or different) represent an aliphatic hydrocarbon radical containing from 1 to 30 carbon atoms and wherein the sum of the total number of carbon atoms of R and R' is between 7 and 40.

31. The binder according to claim 25 wherein the organic compound derived from a group IVB metal is used in an amount varying between 0.2 and 4% by weight based on the polyisocyanate.

32. The binder of claim 1 wherein the polyisocyanate is diphenylmethane diisocyanate or a mixture of methylene bridged polyphenyl polyisocyanates.

33. The binder of claim 1 further comprising an inert diluent.

34. The binder according to claim 33 wherein said diluent is used in an amount varying between 1 and 15% by weight based on the polyisocyanate.

35. The binder according to claim 33 wherein said diluent is methyloleate.

36. The binder of claim 1 further comprising a coupling agent.

37. The binder according to claim 36 wherein said coupling agent is an organofunctional silane.

38. The binder according to claim 37 wherein said organofunctional silane is used in an amount of between 0.01 and 3% by weight based on the polyisocyanate.

39. A polyisocyanate composition for binding lignocellulosic materials comprising an organic compound derived from a metal of Group IVB of the Periodic Table of Elements, said organic compound being a chelate complex with the metal as central atom and with at least one polydentate ligand, wherein the chelate complex corresponds to the following formula (I):

$$\begin{array}{c}R^1-\underset{\underset{X^1}{\|}}{C}-CH=\underset{\underset{X^2}{|}}{C}-(O)_y-R^2\\R^5-(C)_{z'}-O-\underset{\underset{X^4}{|}}{M}-O-(C)_z-R^6\\\underset{X^3}{\|}\quad\underset{X^4}{|}\quad\underset{X^5}{|}\quad\underset{X^6}{\|}\\R^3-(O)_{y'}-\underset{\|}{C}=CH-\underset{\|}{C}-R^4\end{array} \quad (I)$$

wherein $X^1, X^2, X^3, X^4, X^5$, and $X^6$ each individually represent O, S, or N;

y, y', z, and z' each individually represent 0 or 1;

$R^1, R^2, R^3, R^4, R^5$, and $R^6$ each individually represent an aliphatic hydrocarbon radical having 1 to 30 carbon atoms; and M represents Ti, Zr, or Hf;

with the proviso that the polyisocyanate composition is exclusive of any hydroxyl containing compounds.

* * * * *